US012725916B2

(12) United States Patent
Do et al.

(10) Patent No.: US 12,725,916 B2
(45) Date of Patent: Sep. 1, 2026

(54) LOW DIELECTRIC, LOW LOSS RADOME

(71) Applicant: Laird Technologies, Inc., Chesterfield, MO (US)

(72) Inventors: Hoang Dinh Do, Canton, MA (US); Richard N. Johnson, Encinitas, CA (US); Douglas S. McBain, Wadsworth, OH (US)

(73) Assignee: Laird Technologies, Inc., Chesterfield, MO (US)

( * ) Notice: Subject to any disclaimer, the term of this patent is extended or adjusted under 35 U.S.C. 154(b) by 313 days.

(21) Appl. No.: 18/527,949

(22) Filed: Dec. 4, 2023

(65) Prior Publication Data

US 2024/0106111 A1 Mar. 28, 2024

Related U.S. Application Data

(63) Continuation of application No. 17/490,831, filed on Sep. 30, 2021, now Pat. No. 11,848,491, which is a
(Continued)

(51) Int. Cl.
*H01Q 1/42* (2006.01)
*B32B 3/12* (2006.01)
(Continued)

(52) U.S. Cl.
CPC ............... *H01Q 1/422* (2013.01); *B32B 3/12* (2013.01); *B32B 5/024* (2013.01); *B32B 5/18* (2013.01); *B32B 5/245* (2013.01); *B32B 7/025* (2019.01); *B32B 27/12* (2013.01); *B32B 2250/03* (2013.01); *B32B 2250/40* (2013.01); *B32B 2260/021* (2013.01); *B32B 2260/046* (2013.01); *B32B 2262/0253* (2013.01); *B32B 2262/0269* (2013.01); *B32B 2264/107* (2013.01); *B32B 2307/204* (2013.01);
(Continued)

(58) Field of Classification Search
None
See application file for complete search history.

(56) References Cited

U.S. PATENT DOCUMENTS 4,956,393 A 9/1990 Boyd et al.
5,707,723 A 1/1998 Harrison et al.
(Continued)

FOREIGN PATENT DOCUMENTS

CN 106700235 A 5/2017
CN 106947251 A 7/2017
(Continued)

OTHER PUBLICATIONS

European Office Action for EP20783690.9 that claims priority to the same parent application as the instant application; dated Jun. 25, 2025; 9 pages.
(Continued)

*Primary Examiner* — Chinessa T. Golden
(74) *Attorney, Agent, or Firm* — Harness, Dickey & Pierce, P.L.C.; Anthony G. Fussner

(57) ABSTRACT

A low dielectric, low loss radome comprising microspheres integrated into a matrix. The microspheres reduce overall dielectric constant, whereby the radome has a dielectric constant less than 2.5 through a thickness of the radome.

35 Claims, 4 Drawing Sheets

Related U.S. Application Data continuation of application No. PCT/US2020/026098, filed on Apr. 1, 2020.

(60) Provisional application No. 62/845,111, filed on May 8, 2019, provisional application No. 62/828,922, filed on Apr. 3, 2019.

(51) Int. Cl.

| | |
|---|---|
| ***B32B 5/02*** | (2006.01) |
| ***B32B 5/18*** | (2006.01) |
| ***B32B 5/24*** | (2006.01) |
| ***B32B 7/025*** | (2019.01) |
| ***B32B 27/12*** | (2006.01) |

(52) U.S. Cl.

CPC ... *B32B 2307/3065* (2013.01); *B32B 2307/54* (2013.01); *B32B 2307/558* (2013.01); *B32B 2307/706* (2013.01); *B32B 2307/712* (2013.01)

(56) References Cited

U.S. PATENT DOCUMENTS

| | | | | |
|---|---|---|---|---|
| 6,068,915 | A * | 5/2000 | Harrison | C08J 9/0085 428/313.5 |
| 6,107,976 | A * | 8/2000 | Purinton | H01Q 1/42 343/872 |
| 7,126,525 | B2 | 10/2006 | Suzuki et al. | |
| 7,420,523 | B1 * | 9/2008 | Ziolkowski | H01Q 1/422 343/872 |
| 11,848,491 | B2 | 12/2023 | Do et al. | |
| 2007/0103375 | A1 * | 5/2007 | Laubner | H01Q 1/38 343/702 |
| 2011/0048776 | A1 * | 3/2011 | Qiang | B32B 5/26 523/451 |
| 2013/0040098 | A1 | 2/2013 | Hooker et al. | |
| 2014/0078016 | A1 * | 3/2014 | Corodova | B32B 5/28 156/60 |
| 2014/0327595 | A1 * | 11/2014 | Van Oosterbosch | B32B 5/024 343/872 |
| 2016/0233578 | A1 | 8/2016 | Kume et al. | |
| 2016/0333167 | A1 | 11/2016 | Gray et al. | |
| 2016/0380345 | A1 | 12/2016 | Kolak et al. | |
| 2018/0375203 | A1 | 12/2018 | Petra et al. | |
| 2019/0291364 | A1 | 9/2019 | O'Connor et al. | |
| 2020/0308364 | A1 | 10/2020 | Veeraraghavan et al. | |
| 2023/0327332 | A1 | 10/2023 | Do et al. | |

FOREIGN PATENT DOCUMENTS

| | | | |
|---|---|---|---|
| CN | 107459805 | A | 12/2017 |
| CN | 109449593 | A | 3/2019 |
| CN | 109776847 | A | 5/2019 |
| CN | 111073148 | A | 4/2020 |
| CN | 113234279 | A | 8/2021 |
| JP | 2005271504 | A | 10/2005 |
| JP | 2016149756 | A | 8/2016 |
| JP | 2017079448 | A | 4/2017 |
| KR | 10-2102129 | | 4/2020 |
| TW | I732510 | | 7/2021 |
| TW | M643952 | U | 7/2023 |
| WO | WO-9112136 | A1 | 8/1991 |
| WO | WO-2020139569 | A1 | 7/2020 |
| WO | WO-2020205923 | A1 | 10/2020 |
| WO | WO-2021023557 | A1 | 2/2021 |

OTHER PUBLICATIONS

Chinese Office Action and its English machine translation for CN201910509775.4 that claims priority to the same parent application as the instant application; dated Jul. 31, 2025; 18 pages.

International Search Report and Written Opinion for PCT/US2020/026098 (published as WO2020205923) that is the parent application to the instant application; dated Jul. 24, 2020; 12 pages.

Taiwan Office Action and its English Translation for Taiwan application No. 109111310 that claims priority to the same parent application as the instant application; 32 pages, dated Dec. 9, 2020.

International Search Report and Written Opinion for PCT/US2021/054705 that names the same Applicant and two of the same inventors as the instant application but is not related through a priority claim; dated Feb. 9, 2022; 11 pages.

Supplementary European Search Report dated May 2, 2022 for EP20783690 that claims priority to the same parent application as the instant appliucation; 10 pages.

Japanese Office Action for JP2021559053 that claims priority to the same parent application as the instant application; dated Nov. 22, 2022; 3 pages.

PCT International Search Report and Written Opinion for PCT/US2022/043973 that is the parent application to the instant application; dated Jan. 13, 2023; 11 pages.

PCT International Search Report and Written Opinion for PCT/US2022/043973 dated Jan. 13, 2023; 11 pages.

Extended European Search Report dated May 2, 2022 for EP20783690 that claims priority to the same parent application as the instant application; 10 pages.

Taiwan Office Action and its English Translation for Taiwan Granted Patent 1732510, dated Jul. 1, 2021, that claims priority to the same U.S. provisional applications as the instant application; 32 pages, dated Dec. 9, 2020.

Chinese Office Action and its English Translation for CN202211212445.7 that claims priority to the same parent application as the instant application; dated Nov. 9, 2023; 14 pages.

Taiwan Office Action for TW111136134 dated Jan. 22, 2024 (and its English machine translation) that names 3 of the same inventors, and the same assignee, but is not related through a priority claim; 34 pages.

Chinese office action and its English machine translation for CN201910509775.4 that claims priority to the same parent application as the instant application; dated Dec. 25, 2024; 18 pages.

* cited by examiner

LOW DIELECTRIC, LOW LOSS RADOME

CROSS-REFERENCE TO RELATED APPLICATIONS

This application is continuation of U.S. patent application Ser. No. 17/490,831 filed Sep. 30, 2021, which published as US2022/0029282 on Jan. 27, 2022 and will issue as U.S. Pat. No. 11,848,491 on Dec. 19, 2023. U.S. patent application Ser. No. 17/490,831 is a continuation of PCT International Application No. PCT/US2020/026098 filed Apr. 1, 2020 (published as WO2020/205923 on Oct. 8, 2020), which, in turn claims the benefit of and priority to U.S. Provisional Application No. 62/828,922 filed Apr. 3, 2019 and U.S. Provisional Application No. 62/845,111 filed May 8, 2019. The entire disclosures of each the above applications are incorporated herein by reference.

FIELD

The present disclosure generally relates to low dielectric, low loss radomes.

BACKGROUND

This section provides background information related to the present disclosure which is not necessarily prior art.

A radome is an electromagnetically transparent environmental protection enclosure for an antenna. A radome design typically must satisfy structural requirements for an outdoor environment as well as minimizing electromagnetic energy loss.

DRAWING

The drawing described herein are for illustrative purposes only of selected embodiments and not all possible implementations, and are not intended to limit the scope of the present disclosure.

Corresponding reference numerals may indicate corresponding (though not necessarily identical) parts throughout the several views of the drawings

DETAILED DESCRIPTION

Figure 1:
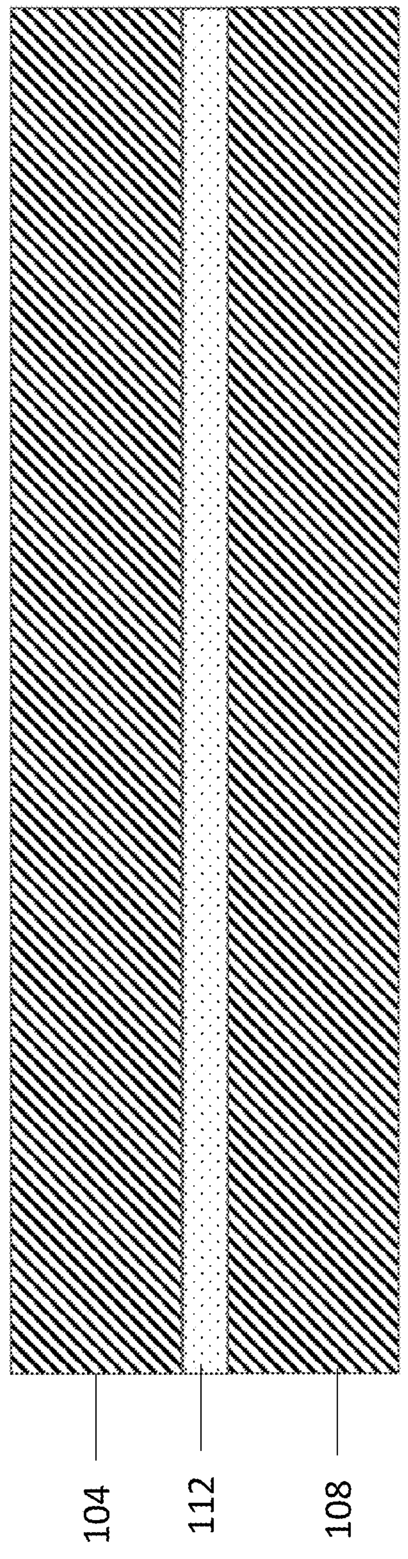
FIG. 1 illustrates an exemplary embodiment of a radome including first and second comingled, homogeneous, and/or integrated layers and an interior layer between the first and second comingled, homogeneous.

Example embodiments will now be described more fully with reference to the accompanying drawings.

Conventional radomes have been made from composite materials that are able to satisfy structural requirements for outdoor use. But as recognized herein, conventional radome composite materials tend to have a rather high dielectric constant (e.g., a dielectric constant of 2.8, etc.) and dielectric loss tangent especially at high frequencies.

Accordingly, disclosed herein are exemplary embodiments of low dielectric, low loss radomes configured to have an overall low dielectric constant and an overall low loss tangent or dissipation factor (DO at relatively high frequencies. For example, disclosed herein are exemplary embodiments of radomes configured to have an overall low dielectric constant (e.g., from about 1.3 to about 1.8, about 1.67, about 1.19, about 1.5, about 1.59, about 1.76, about 1.45, from about 1.3 to about 1.6, less than about 1.3, etc.) and an overall low loss tangent or dissipation factor (DO (e.g., from about 0.002 to about 0.01, about 0.002, about 0.0047, about 0.0024, about 0.0028, about 0.0055, about 0.005, less than about 0.006, etc.) at millimeter wave frequencies and/or relatively high frequencies (e.g., from about 20 Gigahertz (GHz) to 90 GHz, from about 20 GHz to about 50 GHz, from about 24 GHz to about 40 GHz, etc.).

In exemplary embodiments a radome may be configured to have a dielectric constant of about 2 or less at frequencies from about 20 GHz to about 90 GHz and/or from about 20 GHz to about 50 GHz and/or from about 24 GHz to about 40 GHz. For example, the radome may be configured to have a dielectric constant of about 1.85 or less at frequencies from about 20 GHz to about 50 GHz. Or, for example, the radome may be configured to have a dielectric constant of about 1.7 or less at frequencies from about 24 GHz to about 40 GHz.

In some exemplary embodiments, a honeycomb type of low dielectric and low loss material (e.g., polycarbonate honeycomb, etc.) is used for a radome core between low loss composite skins or layers (broadly, portions). The skins or layers may be configured to withstand high impacts and provide outdoor environmental protection. The skins or layers may comprise a thermoplastic and/or thermoset material, a composite thermoset with microspheres (e.g., hollow glass, plastic, and/or ceramic microspheres, microballoons, or bubbles, etc.), polycarbonate, high-density polyethylene (HDPE), prepreg fiberglass or prepreg composite thermoset with microspheres.

In some exemplary embodiments, flame retardant is applied to and/or integrated into a honeycomb core or other porous core of a radome such that the radome core has a UL94 flame rating. The flame retardant preferably forms a sufficiently thin coating or layer along surfaces defining the open cells or pores of the radome core so as to not completely block or occlude the open cells or pores of the radome core. By maintaining a relatively open structure for the radome, a relatively low dielectric constant may thus be achieved for the radome. In some exemplary embodiments, flame retardant may also or alternatively be applied to and/or integrated into one or more other portions of a radome, such as along either or both of the radome's outer skin or layer and/or inner skin or layer.

The flame retardant may comprise a phosphorous-based flame retardant (e.g., ammonium phosphate salt, etc.) that is halogen free in some exemplary embodiments. By way of example, the flame retardant may include no more than a maximum of 900 parts per million chlorine, no more than a maximum of 900 parts per million bromine, and no more than a maximum of 1,500 parts per million total halogens in some exemplary embodiments.

In some exemplary embodiments, the radome includes a core having an open cellular or porous structure with a low dielectric constant (e.g., about 1.05 or less, about 1.03, etc.) and a low loss tangent or dissipation factor (DO (e.g., about 0.0009 or less, etc.). In such exemplary embodiments, the radome may have an overall dielectric constant of about 1.4 and a loss tangent or dissipation factor Df of about 0.002 with the composite skins having a thickness of about 2.5 millimeters (mm). The overall thickness may be as thin as about 1 mm in some exemplary embodiments.

Descriptions will now be provided for different radome samples according to exemplary embodiments. A first radome sample had a thickness of about 3 millimeters, an overall dielectric constant of about 1.68, and a loss tangent of about 0.0047. The first radome sample included a thermoset composite comprising hollow glass microspheres, hollow plastic microspheres, hollow ceramic microspheres, microballoons, or bubbles within a thermoset matrix. The thermoset composite had a dielectric constant of about 1.7. The first radome sample also included composite fiber reinforced resin inner and outer skins, layers, or portions respectively along inner and outer portions of the thermoset composite. The inner and outer skins, layers, or portions each had a dielectric constant of about 2.6. The inner and outer skins, layers, or portions included high-density polyethylene (HDPE) (e.g., SPECTRA manufactured fiber made from ultra-high molecular weight polyethylene, etc.). Additionally, or alternatively, the inner and outer skins, layers, or portions may include high density plastic fibers with a low dielectric constant (e.g., INNEGRA high density polypropylene fibers, etc.).

A second radome sample had a thickness of about 3 millimeters, an overall dielectric constant of about 1.19, and a loss tangent of about 0.0024. The second radome sample included a honeycomb core (e.g., polycarbonate honeycomb, thermoplastic honeycomb, etc.) having a dielectric constant of about 1.03. The second radome sample also included composite fiber reinforced resin inner and outer skins, layers, or portions respectively along inner and outer portions of the honeycomb core. The inner and outer skins, layers, or portions each had a dielectric constant of about 2.6. The inner and outer skins, layers, or portions included high-density polyethylene (HDPE) (e.g., SPECTRA manufactured fiber made from ultra-high molecular weight polyethylene, etc.). Additionally, or alternatively, the inner and outer skins, layers, or portions may include high density plastic fibers with a low dielectric constant (e.g., INNEGRA high density polypropylene fibers, etc.).

A third radome sample had a thickness of about 3.8 millimeters, an overall dielectric constant of about 1.5, a loss tangent of about 0.0028, and a waterproof coating. The third radome sample included a honeycomb core (e.g., polycarbonate honeycomb, thermoplastic honeycomb, etc.) having a dielectric constant of about 1.03. The third radome sample also included composite fiber reinforced resin inner and outer skins, layers, or portions respectively along inner and outer portions of the honeycomb core. The inner and outer skins, layers, or portions each had a dielectric constant of 2.2. The inner and outer skins, layers, or portions comprise a thermoset composite including hollow glass microspheres, hollow plastic microspheres, hollow ceramic microspheres, microballoons, or bubbles and high-density polyethylene (HDPE) fibers (e.g., SPECTRA manufactured fiber made from ultra-high molecular weight polyethylene, etc.). within a thermoset matrix Additionally, or alternatively, the inner and outer skins, layers, or portions may include high density plastic fibers with a low dielectric constant (e.g., INNEGRA high density polypropylene fibers, etc.).

A fourth radome sample had a thickness of about 3.7 millimeters and an overall dielectric constant of about 1.59. The fourth radome sample included a honeycomb core (e.g., polycarbonate honeycomb, thermoplastic honeycomb, etc.) having a dielectric constant of about 1.03. The fourth radome sample also included composite fiber reinforced resin inner and outer skins, layers, or portions along respective inner and outer portions of the honeycomb core. The inner and outer skins, layers, or portions each had a dielectric constant of about 3.6. The inner and outer skins, layers, or portions included a thermoset and hollow glass microspheres, hollow plastic microspheres, hollow ceramic microspheres, microballoons, or bubbles, and fiberglass (e.g., E-glass, etc.).

A fifth radome sample had a thickness of about 2.8 millimeters, an overall dielectric constant of about 1.76, and a loss tangent of about 0.0055. The fifth radome sample included a thermoset composite (e.g., urethane matrix, etc.) including hollow glass microspheres, hollow plastic microspheres, hollow ceramic microspheres, microballoons, or bubbles and a dielectric constant of about 1.6. The fifth radome sample also included fibers/fabric, such as NOMEX flame-resistant meta-aramid material, DACRON open weave polymeric fabric, other open weave polymeric fabric, other prepreg or reinforcement, etc. The fibers/fabric were integrated into, incorporated, comingled, and/or embedded (e.g., calendered, etc.) within the thermoset composite, such that the fifth radome sample had a single unitary structure. The embedded fibers/fabric provide reinforcement and strength to the thermoset composite for carrying loads, whereas the low dielectric hollow glass microspheres, hollow plastic microspheres, hollow ceramic microspheres, microballoons, or bubbles help to reduce the overall dielectric constant. Accordingly, the fifth radome sample did not have a 3-layer laminated A-sandwich structure in which outer and inner skin layers are disposed or laminated on opposite sides of a core.

A sixth radome sample had a thickness within a range from about 1.3 millimeters to about 3 millimeters, an overall dielectric constant of about 1.45, and a loss tangent of about 0.005. The sixth radome sample included a honeycomb core (e.g., polycarbonate honeycomb, thermoplastic honeycomb, etc.) having a dielectric constant of about 1.03. The sixth radome sample also included thermoplastic inner and outer skins, layers, or portions respectively along inner and outer portions of the honeycomb core. The inner and outer skins, layers, or portions each had a dielectric constant of about 2.8. The inner and outer skins, layers, or portions included polycarbonate and thermoplastic acrylic-polyvinyl chloride material (e.g., KYDEX thermoplastic acrylic-polyvinyl chloride material, etc.).

In some exemplary embodiments, a radome includes one or more comingled, homogeneous, and/or integrated layers. Each layer may include fibers/fabric integrated into, incorporated, comingled, and/or embedded within the layer for reinforcement and strength. Each layer may further include hollow glass microspheres, hollow plastic microspheres, hollow ceramic microspheres, microballoons, or bubbles integrated into, incorporated, comingled, and/or embedded within the layer (e.g., syntactic foam, etc.) for reducing the overall dielectric constant.

In one such exemplary embodiment shown in FIG. 1, a radome 100 includes first and second (or upper and lower) comingled, homogeneous, and/or integrated layers 104 and 108. In this exemplary embodiment, the first and second comingled layers 104, 108 include fibers and/or fabric integrated into, incorporated, comingled, and/or embedded therein for reinforcement and strength. Also in this exemplary embodiment, the first and second comingled layers 104, 108 further include hollow glass microspheres, hollow plastic microspheres, hollow ceramic microspheres, microballoons, or bubbles integrated into, incorporated, comingled, and/or embedded within the layers for reducing the overall dielectric constant. One or more optional interior layers 112 may be disposed between the first and second comingled, homogeneous, and/or integrated layers 104, 108 to thereby provide an extra layer(s) for mechanical strength. Accordingly, aspects of the present disclosure allow for a greater degree of freedom by allowing for the addition of optional interior layers for mechanical strength, etc.

Figure 2:
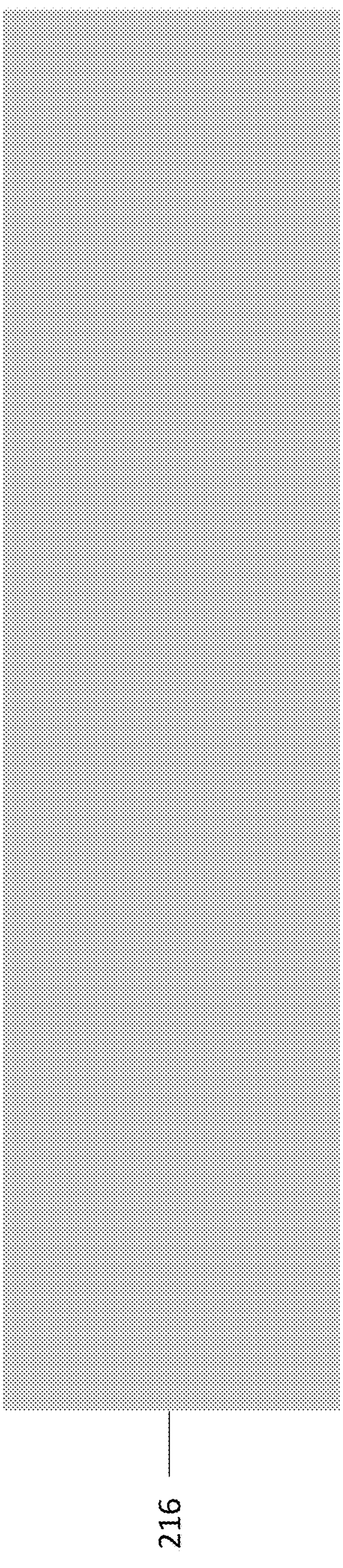
FIG. 2 illustrates an exemplary embodiment of a radome having a single unity structure.

FIG. 2 illustrates an exemplary embodiment of a radome 200 having a single unity structure. In this exemplary embodiment, the radome 200 comprises a uniform, homogenous, or unified (e.g., calendered, etc.) material 216 that is not disposed between inner and outer skin layers, such that the radome 200 does not have a layered sandwich structure. Stated differently, this exemplary embodiment of the radome 200 does not include separate or distinct outer and inner skin layers laminated or otherwise disposed along opposite sides of a core that cooperatively define a three-layer laminated A-sandwich structure.

The uniform material 216 of the radome 200 may comprise reinforced fiber and low dielectric constant, low loss filler (e.g., hollow glass microspheres, hollow plastic microspheres, hollow ceramic microspheres, etc.) within (e.g., calendered, etc.) a thermoset matrix (e.g., epoxy, silicone, polyurethane, phenolic, other thermosetting polymers, resins, plastics, etc.). The reinforced fiber may comprise fibers integrated into, incorporated, comingled, and/or embedded (e.g., calendered, etc.) within the thermoset matrix. For example, fibers and microspheres may be calendered into a thermoset matrix to thereby provide a calendered one-piece structure that is thermoformable prior to cure.

The uniform material 216 of the radome 200 preferably has a consistent ultra-low dielectric constant (e.g., a dielectric constant less than about 2.5, a dielectric constant of 0.7 or less, a dielectric constant of about 1.76 or less at frequencies above 60 GHz, etc.) throughout an entire width or thickness of the uniform material 216. The radome 200 may be configured to provide good or better signal performance at off angles and at incident surface, which, in turn, may provide a better higher frequency bandwidth (e.g., higher than 60 Gigahertz (GHz), etc.) as a result.

In exemplary embodiments, the radome 200 having the unity structure may have an overall thickness within a range from about 2 millimeters (mm) to about 3 mm (e.g., 2 mm, 2.5 mm, 2.75 mm, 3 mm, etc.). In alternative embodiments, the radome 200 may have a different overall thickness, e.g., less than 2 mm more than 3 mm, etc.

In exemplary embodiments, the radome 200 may be configured to have a dielectric strength of at least about 2.6 kilovolt per millimeter, a dielectric constant of about 2 or less, and/or a low loss tangent or dissipation factor (DO of about 0.02 or less at frequencies from about 20 GHz to about 90 GHz and/or from about 20 GHz to about 50 GHz and/or from about 24 GHz to about 40 GHz. For example, the radome 200 may be configured to have a dielectric constant of about 2 or less at frequencies from about 20 GHz to about 90 GHz; and/or a dielectric constant of about 1.85 or less at frequencies from about 20 GHz to about 50 GHz; and/or a dielectric constant of about 1.7 or less at frequencies from about 24 GHz to about 40 GHz.

In exemplary embodiments, the radome (e.g., radome 200 (FIG. 2), etc.) may be configured to have a low dielectric constant, low loss, and low weight. The radome may be configured or suitable for outdoor applications with strong impact resistance, high tensile strength for structural requirements, and rigid. The radome may comprise a homogeneous dielectric constant material providing a uniform dielectric constant through its width. This allows for a low dielectric constant at the initial incident surface for increased signal pass through strength and better signal performance at off angles. The radome may be configured to provide environmental protection of antennas with very low signal interference. The radome may be configured (e.g., optimized, etc.) for performance in 5G antenna applications. The radome's homogeneous structure increases radome performance with increased signal pass through strength and better signal performance at higher incidence angles. The radome may be environmentally friendly solution meets including RoHS and REACH.

By way of example, Table 1 below includes example properties that a radome (e.g., radome 200 (FIG. 2), etc.) may have in exemplary embodiments. In other exemplary embodiments, the radome (e.g., radome 300 (FIG. 3), radome 400 (FIG. 4), etc.) may be configured differently, e.g., have one or more different properties.

TABLE 1

| TYPICAL PROPERTIES | DATA |
|---|---|
| Color | White (painted to customer requirement) |
| Dielectric Constant | 1.7 |
| Loss Tangent | 0.02 |
| Dielectric Strength | 2.60 KV/mm |
| Tensile Strength | 11.11 Mpa |
| Young's Modulus | 1065 MPa |
| Izod Impact Strength | 0.86 J/cm |
| Density | 0.854 g/cc |
| Standard Thicknesses | 2 mm to 4.5 mm |
| Thickness Tolerance | +/−10% |
| Maximum Width/Length | 355 mm × 914 mm |
| Flammability Rating | UL 94 V0 |
| Outdoor Suitability | UL 746C F1 |

Figure 3:
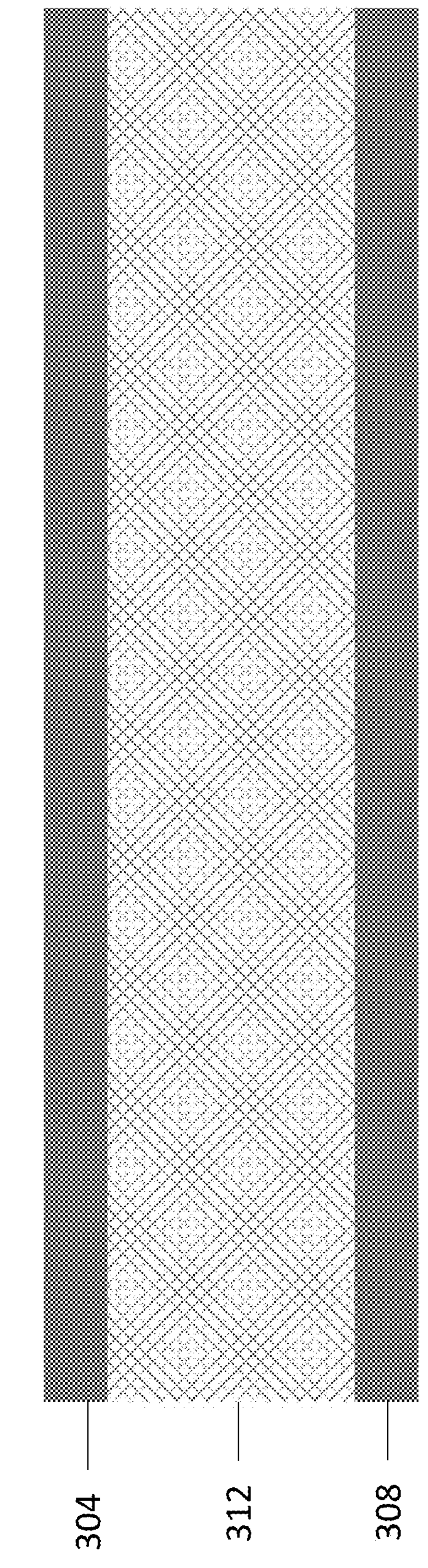
FIG. 3 illustrates an exemplary embodiment of a radome including first and second layers and an interior layer or core between the first and second layers.

FIG. 3 illustrates an exemplary embodiment of a radome 300 including first and second thermoformable thermoplastic layers 304, 308 and an interior thermoformable thermoplastic layer or core 312 between the first and second layers 304, 308. In this exemplary embodiment, the radome 300 may comprise ultra-low dielectric constant thermoformable materials (e.g., thermoplastic skins or layers along a thermoplastic foam core, etc.) such that the radome 300 is thermoformable or heat formable, e.g., into a curved shape, other non-flat or complex shapes, etc. For example, the radome 300 may be thermoformable or heat formable into a complex shape depending on industrial design needs of indoor applications or domed shapes.

The core 312 may comprise a thermoplastic having a low dielectric constant. By way of example, the core 312 may comprise thermoplastic foam, urethane foam, airblown foam, thermoplastic honeycomb, etc.

The first and second layers 304, 308 may comprise a thermoplastic resin material having a low dielectric constant. By way of example, the first and second layers 304, 308 may comprise thermoplastic adhered to the core 312 via adhesive. The first and second layers 304 308 may each have a dielectric constant of about 2.8 or less. The first and second layers 304, 38 may comprise fibers and/or microspheres (e.g., hollow glass, plastic, and/or ceramic microspheres, etc.) within a thermoplastic resin material. The fibers may comprise one or more of one or more of flame-resistant meta-aramid open weave polymeric fabric, high-density polyethylene, ultra-high molecular weight polyethylene, high density plastic fibers with a low dielectric constant, and/or high density polypropylene fibers.

The radome 300 may be configured to provide good or best signal performance with a frequency bandwidth from about 18 GHz to about 40 GHz at zero degree incidence angle.

In exemplary embodiments, the first and second layers 304, 308 may each have a layer thickness within a range from about 0.25 millimeters (mm) to about 0.5 mm (e.g., 0.25 mm, 0.38 mm, 0.43 mm, 0.5 mm, etc.). In other exemplary embodiments, either or both of the first and second layers 304, 308 may have a thickness less than 0.25 mm or more than 0.5 mm, etc. In exemplary embodiments, the first and second layers 304, 308 may each have about the same thickness. In other exemplary embodiments, the first and second layers 304, 308 may have different thicknesses than each other.

In exemplary embodiments, the radome 300 may be configured to have a dielectric strength of at least about 4 kilovolts per millimeter, an overall dielectric constant of about 2 or less, and/or an overall low loss tangent or dissipation factor (DO about 0.01 or less at mmWave 5G frequencies (e.g., 28 GHz, 39 GHz, etc.) and/or frequencies from about 20 GHz to about 90 GHz and/or from about 20 GHz to about 50 GHz and/or from about 24 GHz to about 40 GHz. For example, the radome 300 may be configured to have a dielectric constant of about 2 or less at frequencies from about 20 GHz to about 90 GHz; and/or a dielectric constant of about 1.85 or less at frequencies from about 20 GHz to about 50 GHz; and/or a dielectric constant of about 1.7 or less at frequencies from about 24 GHz to about 40 GHz.

In exemplary embodiments, the radome (e.g., radome 300 (FIG. 3), etc.) may be configured to have a low dielectric constant, low loss, and low weight. The radome may be configured or suitable for outdoor and indoor applications with strong impact resistance, high tensile strength for structural requirements, and rigid. The radome may be thermoplastic and capable of being thermoformed into complex curves to fit device application and aesthetic needs. The radome may be painted to meet customer required color needs. The radome may be configured for use with 5G indoor antenna and router devices.

The radome may be used to provide environmental protection of antennas with very low signal interference. The radome may be configured (e.g., optimized, etc.) for performance in 5G antenna applications. The radome may comprise an all-thermoplastic system and/or have thermoplastic properties that allow the radome material to be thermoformed and integrated into a 5G device's exterior design. The radome may be environmentally friendly solution meets including RoHS and REACH.

By way of example, Table 2 below includes example properties that a radome (e.g., radome 300 (FIG. 3), etc.) may have in exemplary embodiments. In other exemplary embodiments, the radome (e.g., radome 200 (FIG. 2), radome 400 (FIG. 4), etc.) may be configured differently, e.g., have one or more different properties.

TABLE 2

| TYPICAL PROPERTIES | DATA |
|---|---|
| Color | Painted to customer requirement |
| Dielectric Constant | 1.5 |
| Loss Tangent | 0.01 |
| Dielectric Strength | >4 KV/mm |
| Tensile Strength | 14.94 MPa |
| Young's Modulus | 492 MPa |
| Izod Impact Strength | 0.73 J/cm |
| Density | 1.827 g/cc |
| Standard Thicknesses | >2.5 mm |
| Thickness Tolerance | +/−10% |
| Maximum Width/Length | 610 mm × 914 mm |
| Flammability Rating | UL 94 V0 |
| Outdoor Suitability | UL 746C F1 |

Figure 4:
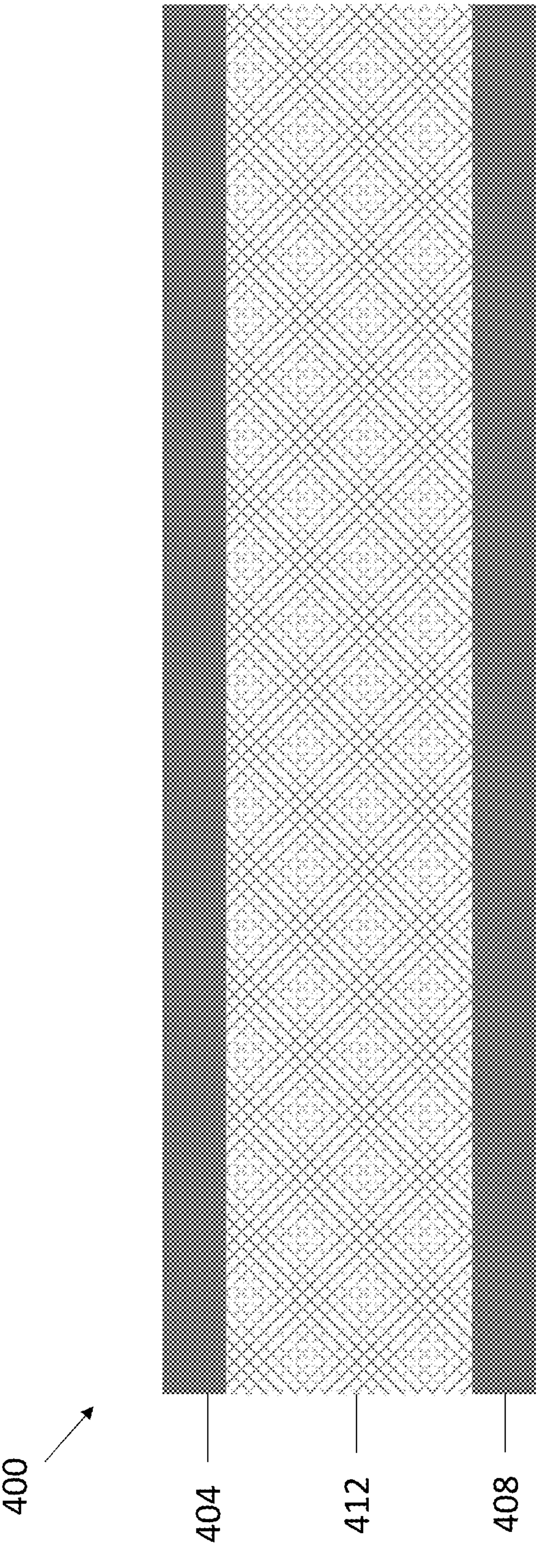
FIG. 4 illustrates an exemplary embodiment of a radome including first and second layers and an interior layer or core between the first and second layers.

FIG. 4 illustrates an exemplary embodiment of a radome 400 including first and second layers 404, 408 and an interior layer or core 412 between the first and second layers 404, 408. By way of example, the core 412 may comprise a honeycomb type of low dielectric and low loss material (e.g., polycarbonate honeycomb, etc.) is used for a radome core between low loss composite skins or layers (broadly, portions). Or, for example, the core 412 may comprise a thermoformable material, foam (e.g., thermoplastic foam, thermosetting foam, urethane foam, etc.), open cellular or porous structure with a low dielectric constant, other materials having a low dielectric constant, etc.

In an exemplary embodiment, the core 412 comprises a thermoset core such that the radome 400 is thermoformed and cured. In another exemplary embodiment, the core 412 comprises a thermoplastic foam core such that the radome 400 is thermoformable.

The first and second layers 404, 408 may comprise reinforced fiber and low dielectric constant, low loss filler (e.g., hollow glass microspheres, hollow plastic microspheres, hollow ceramic microspheres, etc.) within a thermoset (e.g., epoxy, silicone, polyurethane, phenolic, other thermosetting polymers, resins, plastics, etc.). The reinforced fiber may comprise fibers integrated into, incorporated, comingled, and/or embedded (e.g., calendered, etc.) within the thermoset. The first and second layers 404, 408 may be configured to withstand high impacts and provide outdoor environmental protection. The first and second layers 404, 408 may comprise a thermoplastic, thermoset, microspheres (e.g., hollow glass microspheres, hollow plastic microspheres, hollow ceramic microspheres, microballoons, or bubbles, etc.), polycarbonate, high-density polyethylene (HDPE), prepreg fiberglass or prepreg composite thermoset with microspheres, other ultra-low dielectric constant skins, etc.

By way of example, the first and second layers 404, 408 may have a relatively low dielectric constant (e.g., lower than the dielectric constant of the first and second layers 304, 308 of radome 300, etc.) for a better high frequency bandwidth and good overall performance from about 18 GHz to about 90 GHz. The radome 400 may be configured to have lower loss as a signal enters the material. The radome 400 may be configured to provide better and/or allow for more constant off angle performance.

In exemplary embodiments, the first and second layers 404, 408 may each have a layer thickness within a range from about 0.25 millimeters (mm) to about 1 mm (e.g., 0.25 mm, 0.38 mm, 0.5 mm, 1 mm, etc.). In other exemplary embodiments, either or both of the first and second layers 404, 408 may have a thickness less than 0.25 mm or more than 1 mm, etc. In exemplary embodiments, the first and second layers 404, 308 may each have about the same thickness. In other exemplary embodiments, the first and second layers 404, 408 may have different thicknesses than each other.

In exemplary embodiments, the radome 400 may be configured to have a dielectric strength of at least about 3.56 kilovolts per millimeter, an overall dielectric constant of about 2 or less, and/or an overall low loss tangent or dissipation factor (DO about 0.05 or less at mmWave 5G frequencies (e.g., 28 GHz, 39 GHz, etc.) and/or frequencies from about 20 GHz to about 90 GHz and/or from about 20 GHz to about 50 GHz and/or from about 24 GHz to about 40 GHz. For example, the radome 400 may be configured to have a dielectric constant of about 2 or less at frequencies from about 20 GHz to about 90 GHz; and/or a dielectric constant of about 1.85 or less at frequencies from about 20 GHz to about 50 GHz; and/or a dielectric constant of about 1.7 or less at frequencies from about 24 GHz to about 40 GHz.

In exemplary embodiments, the radome 400 may comprise a partially cured B-stage material configured to be formed or shaped in three dimensions and fully cured; and/or a B-staged epoxy resin including fabric and/or fibers embedded therein.

In exemplary embodiments, the radome (e.g., radome 400 (FIG. 4), etc.) may be configured to have a low dielectric constant, low loss, and low weight. The radome may be configured or suitable for outdoor applications with strong impact resistance, high tensile strength for structural requirements, and rigid. The radome has an ultra-low dielectric constant outer surface to enhance antenna signal performance and provide better impact resistance. The low dielectric constant outer incident surface allows for less signal strength loss as the signal enters the material compared to an overall low dielectric constant (dK) material with a higher dielectric constant outer surface. The radome may be used to provide environmental protection of antennas with very low signal interference. The radome may be configured (e.g., optimized, etc.) for performance in 5G antenna applications. The radome may have a low dielectric surface increasing radome performance with increased signal pass through strength. The radome may be environmentally friendly solution meets including RoHS and REACH.

By way of example, Table 3 below includes example properties that a radome (e.g., radome 400 (FIG. 4), etc.) may have in exemplary embodiments. In other exemplary embodiments, the radome (e.g., radome 200 (FIG. 2), radome 300 (FIG. 3), etc.) may be configured differently, e.g., have one or more different properties.

TABLE 3

| TYPICAL PROPERTIES | DATA |
|---|---|
| Color | Light Grey (painted to customer requirement) |
| Dielectric Constant | 1.5 |
| Loss Tangent | 0.01-0.05 |
| Dielectric Strength | 3.56 KV/mm |
| Tensile Strength | 14.24 MPa |
| Young's Modulus | 527 MPa |
| Izod Impact Strength | 1.04 J/cm |
| Density | 0.775 g/cc |
| Standard Thicknesses | >2.5 mm |
| Thickness Tolerance | +/−10% |
| Maximum Width/Length | 355 mm × 914 mm |
| Flammability Rating | UL 94 V0 |
| Outdoor Suitability | UL 746C F1 |

In an exemplary embodiment, an injection molded low dielectric, low loss radome may comprise fibers and/or microspheres within an injection moldable resin matrix. The radome may be configured to have an overall dielectric constant within a range from about 1.5 to about 2.5 and an overall low loss tangent or dissipation factor (DO less than about 0.01 at mmWave 5G frequencies (e.g., 28 GHz, 39 GHz, etc.) and/or frequencies from about 20 GHz to about 90 GHz and/or from about 20 GHz to about 50 GHz and/or from about 24 GHz to about 40 GHz.

The injection moldable resin may comprises polypropylene (PP) and/or polycarbonate/polybutylene terephthalate (PC/PBT) blend. The fibers may comprise one or more of high-density polyethylene, ultra-high molecular weight polyethylene, high density plastic fibers with a low dielectric constant, and/or high density polypropylene fibers. The microspheres may comprise one or more of hollow glass microspheres, hollow plastic microspheres, and/or hollow ceramic microspheres.

In exemplary embodiments, the injection molded low dielectric, low loss radome may be configured to have a dielectric constant of about 2 or less at frequencies from about 20 GHz to about 90 GHz; and/or a dielectric constant of about 1.85 or less at frequencies from about 20 GHz to about 50 GHz; and/or a dielectric constant of about 1.7 or less at frequencies from about 24 GHz to about 40 GHz.

Also disclosed are exemplary methods of making low dielectric, low loss radomes having a dielectric constant of about 2.5 or less. For example, the radome may be configured to have a dielectric constant of about 2 or less at frequencies from about 20 GHz to about 90 GHz; and/or a dielectric constant of about 1.85 or less at frequencies from about 20 GHz to about 50 GHz; and/or a dielectric constant of about 1.7 or less at frequencies from about 24 GHz to about 40 GHz.

In an exemplary embodiment, a method of making a low dielectric, low loss radome comprises integrating fibers and microspheres into a matrix to thereby provide a radome having a homogenous and/or unitary structure with a substantially uniform low dielectric constant through a thickness of the radome. The fibers and microspheres may be integrated into the matrix by calendering the fibers and microspheres into the matrix, to thereby provide a calendered one-piece structure that is thermoformable prior cure.

In another exemplary embodiment, a method of making a low dielectric, low loss radome comprises thermoforming a thermoplastic core between first and second thermoplastic layers to thereby provide a thermoformed radome. For example, the method may include thermoforming the thermoplastic core between the first and second thermoplastic layers to thereby provide the thermoformed radome having a complex and/or curved shape. The thermoplastic core may comprise a thermoplastic foam or a thermoplastic honeycomb. The first and second thermoplastic layers may comprise a thermoplastic resin material.

In a further exemplary embodiment, a method of making a low dielectric, low loss radome comprises injection molding a composite material including a thermoplastic resin including microspheres and/or fibers to thereby provide an injection molded radome. The thermoplastic resin may comprise polypropylene (PP) and/or polycarbonate/polybutylene terephthalate (PC/PBT) blend.

Any one of the radome 100 (FIG. 1), radome 200 (FIG. 2), radome 300 (FIG. 3), radome 400 (FIG. 4), first, second, third, fourth, fifth, and sixth radome samples described above, and other radomes disclosed herein may be provided with flame retardant in exemplary embodiments. For example, flame retardant may be applied along, integrated into, and/or embedded within at least a portion (e.g., the core and/or the outer and/or inner skins, layer, or portions, etc.) of a radome made according to the first, second, third, fourth, fifth, and sixth radome samples. For example, flame retardant may be applied to and/or integrated into the honeycomb core of the second, third, fourth, and/or sixth radome samples, such that the radome's core has a UL94 flame rating. The flame retardant may be applied as a sufficiently thin coating or layer along surfaces defining the open cells or pores of the honeycomb core so as to not completely block or occlude the open cells or pores of the honeycomb core. By maintaining a relatively open structure for the radome core, a relatively low dielectric constant may thus be achieved for the radome.

Also disclosed herein are exemplary methods of making low dielectric, low loss radomes, which may include calendering, thermal forming, compression molding with sheet molding compound (SMC) (e.g., polycarbonate, high-density polyethylene (HDPE), other sheet molding compound that is a ready to mold glass-fiber reinforced polyester material suitable for use with compression molding, etc.), etc.

In an exemplary embodiment, a method generally includes cutting and preparation of the fabrics, stacking and pre-forming of the fabrics, laying-up the fabrics, molding and curing the fabrics under heat and pressure, and demolding of the cured part. Continuing with this example, cutting and preparation of the fabrics (broadly, materials) may including cutting and preparation of prepreg and sheet molding compound. The prepreg (e.g., multiple sheets of prepreg, etc.) may be stacked between the upper and lower sheets of the sheet molding compound and preformed to have a curvature or other suitable shape. The stacked/preformed prepreg and sheet molding compound may be positioned within a mold cavity, and then molded and cured under heat and pressure. The resulting cured part may then be demolded and removed from the mold cavity.

In exemplary embodiments, a radome may be made by a method or process (e.g., calendering, etc.) during which fibers/fabric are embedded, integrated, incorporated, comingled, and/or mixed within a thermoset or epoxy having microspheres (e.g., hollow glass microspheres, hollow plastic microspheres, hollow ceramic microspheres, microballoons, or bubbles, etc.). The embedded fibers/fabric preferably provide reinforcement and strength to the composite thermoset for carrying loads, whereas the low dielectric microspheres preferably help to reduce the overall dielectric constant. The embedded fibers/fabric may comprise NOMEX flame-resistant meta-aramid material, DACRON open weave polymeric fabric, other open weave polymeric fabric, other prepreg or reinforcement, etc. The radome material may be drawn or otherwise shaped in three dimensions. In such exemplary embodiments, the radome has a single unitary structure, e.g., does not have a 3-layer laminated A-sandwich structure, does not have separate outer and inner skin layers, etc.

In exemplary embodiments, a radome may be made by a B-staging method or process. For example, a radome may be made from a B-stage material (e.g., B-staged epoxy resin including fabric/fibers embedded therein, etc.) that is partially cured. The partially cured B-stage material may then later be formed (e.g., drawn or otherwise shaped in three dimensions of the radome, etc.) and fully cured. In such exemplary embodiment, the B-staging method or process may allow for better handeability and/or processability.

In exemplary embodiments, the radome construction is anisotropic and/or configured to provide a performance enhancement by minimizing or reducing cross polarization differences between horizontal and vertical polarizations. The radome may be configured to steer, direct, focus, reflect, or diffuse overlapping signals or beams having different polarizations for less divergence. The radome may be configured to be anisotropic by embedding fibers when calendering or mixing microspheres such that the fibers have a predetermined orientation (e.g., oriented vertically and/or oriented horizontally, etc.). By orienting the fibers in a predetermined orientation(s), the radome may be configured to be anisotropic and have property(ies) that differ in different directions.

In exemplary embodiments, a relatively thin flame retardant coating or layer may be applied to and/or integrated into at least a portion of the radome such that the radome has a UL94 flame rating. The flame retardant coating or layer may be sufficiently thin (e.g., a thickness within a range from about 0.002 microns to about 0.005 microns, etc.) so as to not completely occlude or block open cells of a core of the radome. In addition, exemplary embodiments, the radome is not sealed with a resin in order to also maintain an open cellular or porous structure for the radome. By maintaining the open cellular or porous structure for the radome, the relatively low dielectric constant of the radome may be maintained. The flame retardant may comprise a phosphorous-based flame retardant (e.g., ammonium phosphate salt, etc.) that is halogen free. By way of example, the flame retardant may include no more than a maximum of 900 parts per million chlorine, no more than a maximum of 900 parts per million bromine, and no more than a maximum of 1,500 parts per million total halogens.

In exemplary embodiments, a radome includes a thermoplastic honeycomb core with or without flame retardant applied to and/or integrated into the core. The core may be disposed between thermoplastic, thermoset, and/or fiber reinforced resin skin layers with or without flame retardant applied to and/or integrated into the skin layers. The skin layers may comprise a thermoset or epoxy material with microspheres (e.g., hollow glass microspheres, hollow plastic microspheres, hollow ceramic microspheres, microballoons, or bubbles, etc.). The microspheres may help to reduce the overall dielectric constant. The skin layers may also include fibers/fabric integrated into, incorporated, comingled, and/or embedded therein. The embedded fibers/fabric may help to provide reinforcement and strength for carrying loads. The embedded fibers/fabric may comprise NOMEX flame-resistant meta-aramid material, DACRON open weave polymeric fabric, other open weave polymeric fabric, other prepreg or reinforcement, etc.

In other exemplary embodiments, a radome includes skin layers with or without flame retardant applied to or integrated into the skin layers. The skin layers may comprise a thermoset material with microspheres (e.g., hollow glass microspheres, hollow plastic microspheres, hollow ceramic microspheres, microballoons, or bubbles, etc.) and fibers/fabric prepreg (e.g., NOMEX flame-resistant meta-aramid material, DACRON open weave polymeric fabric, other open weave polymeric fabric, other prepreg or reinforcement, etc.). The radome may include low loss dielectric thermoset material with or without flame retardant (e.g., applied thereto and/or integrated therein, etc.) and that includes microspheres (e.g., hollow glass microspheres, hollow plastic microspheres, hollow ceramic microspheres, microballoons, or bubbles, etc.).

Exemplary embodiments disclosed herein may include or provide one or more (but not necessarily any or all) of the following advantages or features, such as:

- an overall low dielectric constant and an overall low loss tangent or dissipation factor (Df) at millimeter wave frequencies and/or at relatively high frequencies; and/or
- a relatively strong core structure (e.g., thermoset composite or epoxy with microspheres (e.g., hollow glass microspheres, hollow plastic microspheres, hollow ceramic microspheres, microballoons, or bubbles, etc.), thermoplastic honeycomb structure, etc.) that minimizes or at least reduces electromagnetic energy loss; and/or outer portions (e.g., outer surfaces, skins, etc.) that provide environmental protection and are capable of withstanding high impact; and/or relatively low cost; and/or allow for complexly shaped radomes to be made using a compression molding process; and/or flame retardant (e.g., UL94 flammability certification, etc.); and/or suitable for outdoor use (e.g., UL756C F1 ultraviolet (UV) and water immersion certification, etc.); and/or fitness for long-term ambient heat (e.g., UL 746B RTI certification, etc.).

In exemplary embodiments, a radome may be configured to provide outdoor environmental protection for 5G/mm-Wave antennas. In exemplary embodiments, a radome may be configured for use with indoor antennas, repeaters, routers, etc. that convert 5G signals to WiFi for in-building use. Exemplary embodiments disclosed herein may include or provide one or more (but not necessarily any or all) of the usage benefits, such as very low signal loss for high frequencies, ultra low dielectric constant material, rigid, impact resistant, good tensile strength for structural requirements, and/or lightweight. Exemplary embodiments may accommodate for mmWave 5G frequencies (e.g., 28 GHz, 39 GHz, etc.) and/or frequencies from about 20 GHz to about 90 GHz and/or from about 20 GHz to about 50 GHz and/or from about 24 GHz to about 40 GHz. Exemplary embodiments of the low dielectric constant radomes disclosed herein may allow power to be boosted (e.g., by about twenty-five percent or more, etc.) at 5G frequencies as compared to some conventional radomes, which power boost may be advantageous as 5G signals tend to have problems with penetration into buildings and homes.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific numerical dimensions and values, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (the disclosure of a first value and a second value for a given parameter may be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. For example, when permissive phrases, such as "may comprise", "may include", and the like, are used herein, at least one system comprises or includes the feature(s) in at least one exemplary embodiment. As used herein, the singular forms "a", "an" and "the" may be intended to include the plural forms as well, unless the context clearly indicates otherwise. The terms "comprises," "comprising," "includes," "including," "has," "have," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section could be termed a second element, component, region, layer or section without departing from the teachings of the example embodiments.

Spatially relative terms, such as "inner," "outer," "beneath", "below", "lower", "above", "upper", "top", "bottom", and the like, may be used herein for ease of description to describe one element or feature's relationship to another element(s) or feature(s). Spatially relative terms may be intended to encompass different orientations of the device in use or operation. For example, if the device is turned over, elements described as "below" or "beneath" other elements or features would then be oriented "above" the other elements or features. Thus, the example term "below" may encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and may be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A low dielectric, low loss radome comprising low dielectric constant, low loss filler integrated into a matrix, the low dielectric constant, low loss filler reducing overall dielectric constant, wherein the low dielectric constant, low loss filler is distributed throughout the matrix such that the radome exhibits a substantially uniform dielectric of less than 2.5 through an entire thickness of the radome at frequencies from about 20 GHz to about 90 GHz.

2. The radome of claim 1, further comprising fibers, and wherein the fibers and the low dielectric constant, low loss filler are co-integrated into the matrix such that the radome has a homogenous and/or unitary structure that is thermoformable prior to cure.

3. The radome of claim 2, wherein the homogenous and/or unitary structure is a single layer structure.

4. The radome of claim 1, wherein the radome comprises first and second thermoplastic layers and a thermoplastic core between the first and second thermoplastic layers, whereby the radome is thermoformable, wherein:

the thermoplastic core comprises a thermoplastic foam or a thermoplastic honeycomb; and the first and second thermoplastic layers comprise the low dielectric constant, low loss filler integrated into the matrix.

5. The radome of claim 4, wherein:

the first and second thermoplastic layers further comprise fibers integrated into the first and second thermoplastic layers for reinforcement and mechanical strength; and the low dielectric constant, low loss filler is integrated into the first and second thermoplastic layers and reduce the overall dielectric constant of the radome, whereby the first and second thermoplastic layers each have a dielectric constant of about 2.8 or less.

6. The radome of claim 1, wherein:

the matrix comprises an injection moldable resin; and the radome is an injection molded radome configured to have an overall dielectric constant within a range from about 1.5 to about 2.5 and an overall low loss tangent or dissipation factor (Df) less than about 0.01 at frequencies from about 20 GHz to about 90 GHz and/or from about 20 GHz to about 50 GHz and/or from about 24 GHz to about 40 GHz.

7. The radome of claim 1, wherein:

the matrix comprises an injection moldable resin; and/or the matrix comprises polypropylene; and/or the matrix comprises a blend of polycarbonate and polybutylene terephthalate.

8. The radome of claim 1, further comprising fibers within the matrix, wherein:

the fibers comprise one or more of flame-resistant meta-aramid material, open weave polymeric fabric, high-density polyethylene, ultra-high molecular weight polyethylene, high density plastic fibers with a low dielectric constant, and/or high density polypropylene fibers; and the low dielectric constant, low loss filler comprises one or more of hollow glass microspheres, hollow plastic microspheres, hollow ceramic microspheres, microballoons, and/or bubbles.

9. The radome of claim 1, further comprising fibers, and wherein the fibers and the low dielectric constant, low loss filler is integrated into the matrix such that the radome does not have outer and inner skin layers disposed on opposite sides of a core that define a three-layer A-sandwich structure.

10. The radome of claim 1, further comprising flame retardant applied to and/or integrated into at least a portion of the radome such that the radome has a UL94 flame rating of V0.

11. The radome of claim 1, further comprising fibers within the matrix for reinforcement and mechanical strength.

12. The radome of claim 1, wherein the radome is configured to be anisotropic and/or configured to reduce cross polarization differences between horizontal and vertical polarizations.

13. The radome of claim 1, wherein the radome is configured to have:

a dielectric constant of about 2 or less at frequencies from about 20 GHz to about 90 GHz; and/or a dielectric constant of about 1.85 or less at frequencies from about 20 GHz to about 50 GHz; and/or a dielectric constant of about 1.7 or less at frequencies from about 24 GHz to about 40 GHz.

14. The radome of claim 1, wherein the low dielectric constant, low loss filler comprises microspheres.

15. The radome of claim 14, wherein the microspheres comprise one or more of hollow glass microspheres, hollow plastic microspheres, hollow ceramic microspheres, microballoons, and/or bubbles.

16. The radome of claim 1, wherein the low dielectric constant, low loss filler comprises microballoons.

17. The radome of claim 1, wherein the low dielectric constant, low loss filler comprises bubbles.

18. The radome of claim 1, wherein:

the low dielectric constant, low loss filler comprises microspheres that are distributed throughout the matrix such that the radome exhibits the substantially uniform dielectric constant of less than 2.5 across the entire thickness of the radome at frequencies from about 20 GHz to about 90 GHz; and the radome is configured to minimize signal reflection at an incident surface by avoiding discrete high-dielectric skin layers.

19. The radome of claim 1, wherein:

the low dielectric constant, low loss filler comprises bubbles that are distributed throughout the matrix such that the radome exhibits the substantially uniform dielectric constant of less than 2.5 across the entire thickness of the radome at frequencies from about 20 GHz to about 90 GHz; and the radome is configured to minimize signal reflection at an incident surface by avoiding discrete high-dielectric skin layers.

20. The radome of claim 1, wherein:

the low dielectric constant, low loss filler comprises microballoons that are distributed throughout the matrix such that the radome exhibits the substantially uniform dielectric constant of less than 2.5 across the entire thickness of the radome at frequencies from about 20 GHz to about 90 GHz; and the radome is configured to minimize signal reflection at an incident surface by avoiding discrete high-dielectric skin layers.

21. The radome of claim 1, wherein the radome is configured to minimize signal reflection at an incident surface by avoiding discrete high-dielectric skin layers.

22. A low dielectric, low loss radome comprising first and second layers and a core between the first and second layers, wherein:

each of the first and second layers comprise low dielectric constant, low loss filler integrated into a matrix; and the first layer, the core, and the second layer cooperate to provide a substantially uniform effective dielectric constant of less than 2.5 through a thickness of the radome.

23. The radome of claim 22, wherein:

the first and second layers further comprise fibers integrated into the first and second layers for reinforcement and mechanical strength; and the low dielectric constant, low loss filler is integrated into the first and second layers and reduce the overall dielectric constant of the radome, whereby the first and second layers each have a dielectric constant of about 3.6 or less.

24. The radome of claim 22, wherein the core comprises:

a thermoplastic honeycomb core having a dielectric constant of about 1.03 or less;

honeycomb cells of the thermoplastic honeycomb core remain substantially open such that the dielectric constant is not increased by pore-filling resin;

honeycomb cell walls are coated with flame retardant at a thickness insufficient to occlude the honeycomb cells; and the low dielectric constant, low loss filler comprises microspheres including one or more of hollow glass microspheres, hollow plastic microspheres, hollow ceramic microspheres, microballoons, and/or bubbles.

25. The radome of claim 22, wherein the core comprises a thermoset core such that the radome is thermoformed and cured.

26. The radome of claim 22, wherein the radome comprises:

a partially cured B-stage material configured to be formed or shaped in three dimensions and fully cured; and/or a B-staged epoxy resin including fabric and/or fibers embedded therein.

27. A material for a low dielectric, low loss radome, the material comprising low dielectric constant, low loss filler integrated into a matrix, the low dielectric constant, low loss filler reducing overall dielectric constant, wherein the low dielectric constant, low loss filler is distributed throughout the matrix such that the material exhibits a substantially uniform dielectric of less than 2.5 through an entire thickness of the material at frequencies from about 20 GHz to about 90 GHz.

28. The material of claim 27, wherein the low dielectric constant, low loss filler comprises one or more of hollow glass microspheres, hollow plastic microspheres, hollow ceramic microspheres, microballoons, and/or bubbles; and wherein:

the matrix comprises an injection moldable resin, polypropylene, and/or a blend of polycarbonate and polybutylene terephthalate; and/or the material comprises fibers within the matrix, the fibers comprising one or more of flame-resistant meta-aramid material, open weave polymeric fabric, high-density polyethylene, ultra-high molecular weight polyethylene, high density plastic fibers with a low dielectric constant, and/or high density polypropylene fibers.

29. The material of claim 27, further comprising flame retardant applied to and/or integrated into the material such that the material has a UL94 flame rating of V0, and wherein the material is configured to have:

a dielectric constant of about 2 or less at frequencies from about 20 GHz to about 90 GHz; and/or a dielectric constant of about 1.85 or less at frequencies from about 20 GHz to about 50 GHz; and/or a dielectric constant of about 1.7 or less at frequencies from about 24 GHz to about 40 GHz.

30. The material of claim 27, wherein the low dielectric constant, low loss filler comprises microspheres.

31. The material of claim 30, wherein the microspheres comprise one or more of hollow glass microspheres, hollow plastic microspheres, hollow ceramic microspheres, microballoons, and/or bubbles.

32. The material of claim 27, wherein the low dielectric constant, low loss filler comprises microballoons.

33. The material of claim 27, wherein the low dielectric constant, low loss filler comprises bubbles.

34. The material of claim 27, wherein:

the low dielectric constant, low loss filler comprises microspheres, bubbles, and/or microballoons that are distributed throughout the matrix such that the material exhibits the substantially uniform dielectric constant of less than 2.5 across the entire thickness of the material at frequencies from about 20 GHz to about 90 GHz; and the material is configured to minimize signal reflection at an incident surface by avoiding discrete high-dielectric skin layers.

35. The material of claim 27, wherein the material is configured to minimize signal reflection at an incident surface by avoiding discrete high-dielectric skin layers.

* * * * *